United States Patent
Krok et al.

(10) Patent No.: US 8,886,362 B2
(45) Date of Patent: Nov. 11, 2014

(54) INTEGRATED DISTRIBUTION SYSTEM OPTIMIZATION

(75) Inventors: Michael Joseph Krok, Clifton Park, NY (US); Jason Wayne Black, Dublin, OH (US); Sahika Genc, Niskayuna, NY (US); Murali Mohan Baggu Data Venkata Satya, Glenville, NY (US); Rajesh Tyagi, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 329 days.

(21) Appl. No.: 13/435,940

(22) Filed: Mar. 30, 2012

(65) Prior Publication Data

US 2013/0261823 A1 Oct. 3, 2013

(51) Int. Cl.
*G05F 5/00* (2006.01)
*H02J 3/14* (2006.01)

(52) U.S. Cl.
CPC .... *G05F 5/00* (2013.01); *H02J 3/14* (2013.01)
USPC ............................. 700/291; 700/295; 700/297

(58) Field of Classification Search
None
See application file for complete search history.

(56) References Cited

U.S. PATENT DOCUMENTS

| 7,116,010 | B2 | 10/2006 | Lesseter et al. |
| 7,991,512 | B2 | 8/2011 | Chandra et al. |
| 2010/0179704 | A1 | 7/2010 | Ozog |
| 2012/0150359 | A1* | 6/2012 | Westergaard ................. 700/291 |
| 2012/0245752 | A1* | 9/2012 | Borrett et al. ................. 700/295 |
| 2013/0144451 | A1* | 6/2013 | Kumar et al. ................. 700/291 |
| 2013/0179061 | A1* | 7/2013 | Gadh et al. .................... 701/123 |
| 2013/0184889 | A1* | 7/2013 | Fan et al. ...................... 700/292 |

OTHER PUBLICATIONS

E. M. Lightner, "Smart Grid and DER Integration Activities Supported by the U.S. Department of Energy," 3rd. International Conference on Integration of Renewable and Distributed Energy Resources, Dec. 10-12, 2008, pp. 1-24.

* cited by examiner

*Primary Examiner* — Ryan Jarrett
(74) *Attorney, Agent, or Firm* — Nitin N. Joshi

(57) ABSTRACT

A power forecasting module determines a load forecast of a distribution system (DS) and a power generation forecast of distributed energy resources (DERs) A demand response (DR) module estimates an available DR based on the load and the power generation forecast and modifies the load forecast by dispatching an optimal DR. An energy storage commitment module determines a charging/discharging schedule of energy storage devices in the system based on the modified load profile and generates a second load profile by incorporating the charging/discharging schedule of energy storage devices. An unit commitment (UC) module determines a DER schedule of supplying electrical power to the loads in the second load profile based on a first objective function. An economic dispatch (ED) module determines an optimum operating point for each DER and an Integrated Volt-VAR Control (IVVC) module controls distribution assets to maintain a voltage profile in the system.

21 Claims, 5 Drawing Sheets

INTEGRATED DISTRIBUTION SYSTEM OPTIMIZATION

BACKGROUND

The invention relates generally to an electric power system and more specifically to control of electric power in the electric power system.

The basic structure of the electric power system comprises various hardware elements such as generators, transformers, and real-time monitoring equipment, and software such as power flow analysis software, fault detection software, and restoration software for generation, transmission, and distribution of electricity.

Traditionally, electricity is transmitted from large centralized power plants to the load centers through long transmission lines. Increased demands on electrical power systems have resulted in incidences of electricity shortages, power quality problems, rolling blackouts, and electricity price spikes. Distributed Energy Resources (DERs) which are small-scale power generation sources located close to where electricity is used (e.g., a home or business), provide an alternative to or an enhancement of the traditional electric power system.

DERs are small, modular, electrical power generation and storage technologies, typically producing less than 10 megawatts (MW) of power. DERs provide clean electric power closer to the end-user and hence reduce the amount of energy lost in the transmission system. DER systems can be operated either in grid-connected mode or in isolated mode. DER technologies include wind turbines, photovoltaics (PV), fuel cells, microturbines, reciprocating engines, combustion turbines, cogeneration, sterling engines, and energy storage systems.

As the share of DERs in the total energy supply increases, it will significantly change the existing distribution system planning, design and operation practices. The integration of DERs into a distribution system will have a major impact on feeder capacity, line losses, protection systems and voltage regulation. In order to minimize these impacts and to maximize asset utilization, it may be beneficial for the distribution utilities to coordinate the different DERs along with other distribution assets (e.g. load tap changer, voltage regulator, capacitor bank etc.).

For these and other reasons, there is a need for the present invention.

BRIEF DESCRIPTION

In accordance with an embodiment of the present invention, a system including a power forecasting module, a demand response module and an energy storage commitment module is provided. The power forecasting module determines a load forecast of a distribution system and a power generation forecast of distributed energy resources (DERs) in the distribution system for a period of interest. The demand response module estimates an available demand response on the distribution system for the period of interest based on the load forecast and the power generation forecast and modifies the load forecast by dispatching an optimal demand response. The energy storage commitment module determines a charging and discharging schedule of energy storage devices in the distribution system for the period of interest based on the modified load profile and generates a second load profile by incorporating the charging and discharging schedule of energy storage devices in the modified load profile. The system further includes an unit commitment module, an economic dispatch module and an Integrated Volt-VAR Control (IVVC) module. The unit commitment module determines a DER schedule of supplying electrical power to the loads in the second load profiled based on a first objective function and the economic dispatch module determines an optimum operating point for each DER in the DER schedule. The IVVC module control distribution assets to maintain a voltage profile for the period of interest in the distribution system based on information from the economic dispatch module.

In accordance with another embodiment of the present invention, a method of controlling electrical power in a distribution system is provided. The method includes forecasting a load profile of the distribution system and a power generation profile of distributed energy resources (DERs) in the distribution system for a period of interest and estimating an available demand response on the distribution system for the period of interest. The load profile is modified by dispatching an optimal demand response. The method also includes determining a charging and discharging schedule of energy storage devices in the distribution system for the period of interest based on the modified load profile and generating a second load profile by incorporating the charging and discharging schedule of energy storage devices in the modified load profile. A DER schedule of supplying electrical power to the loads in the second load profile is determined based on a first objective function and an optimum operating point for each DERs in the DER schedule is determined. The method further includes controlling distribution assets in the distribution system to maintain a voltage profile for the period of interest.

In accordance with yet another embodiment of the present invention, a system including a power forecasting module, an energy storage commitment module and a demand response module is provided. The power forecasting module determines a load forecast of a distribution system and a power generation forecast of distributed energy resources (DERs) in the distribution system for a period of interest. The energy storage commitment module determines a charging and discharging schedule of energy storage devices in the distribution system for the period of interest based on the load forecast and the power generation forecast and modifies the load forecast based on the charging and discharging schedule of energy storage devices. The demand response module estimates an available demand response on the distribution system for the period of interest based on the modified load profile and generates a second load profile by dispatching an optimal demand response. The system further includes an unit commitment module, an economic dispatch module and an Integrated Volt-VAR Control (IVVC) module. The unit commitment module determines a DER schedule of supplying electrical power to the loads in the second load profiled based on a first objective function and the economic dispatch module determines an optimum operating point for each DER in the DER schedule. The IVVC module control distribution assets to maintain a voltage profile for the period of interest in the distribution system based on information from the economic dispatch module.

DRAWINGS

These and other features, aspects, and advantages of the present invention will become better understood when the following detailed description is read with reference to the accompanying drawings in which like characters represent like parts throughout the drawings, wherein.

Figure 4:
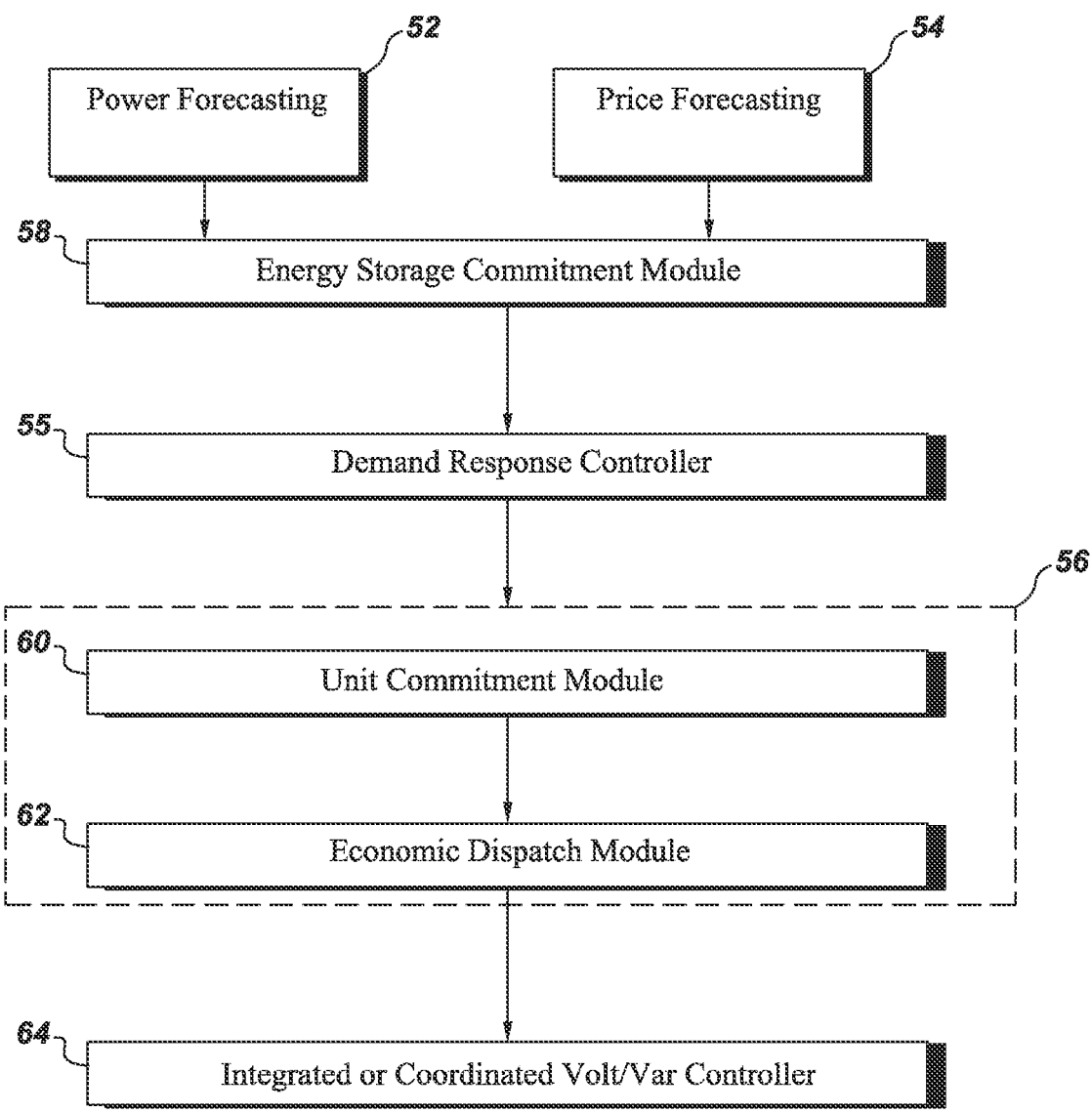
Figure 5:
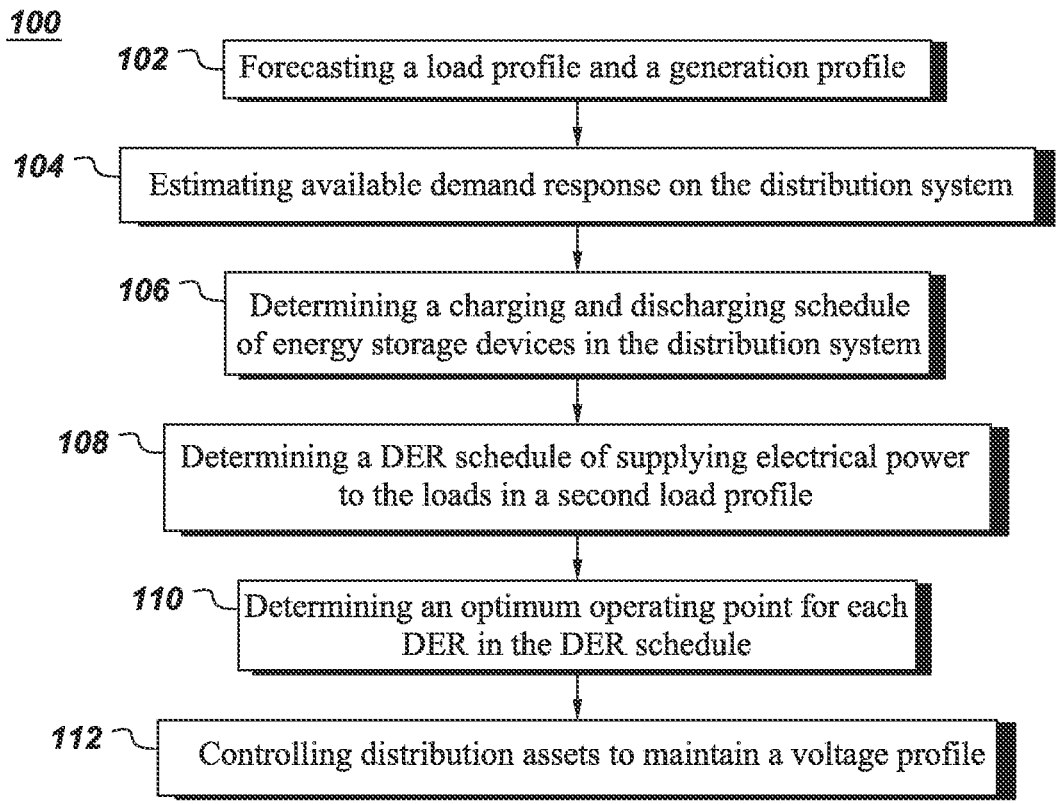

FIG. 4 is another block diagram illustrating coordination between a DER controller, a Demand Response (DR) controller and an Integrated Volt-VAR controller (IVVC) to control power in the distribution system in accordance with an embodiment of the present invention; and FIG. 5 is a flow chart illustrating a method of controlling power in a distribution system in accordance with an embodiment of the present invention.

DETAILED DESCRIPTION

As used herein, the terms "controller" or "module" refers to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
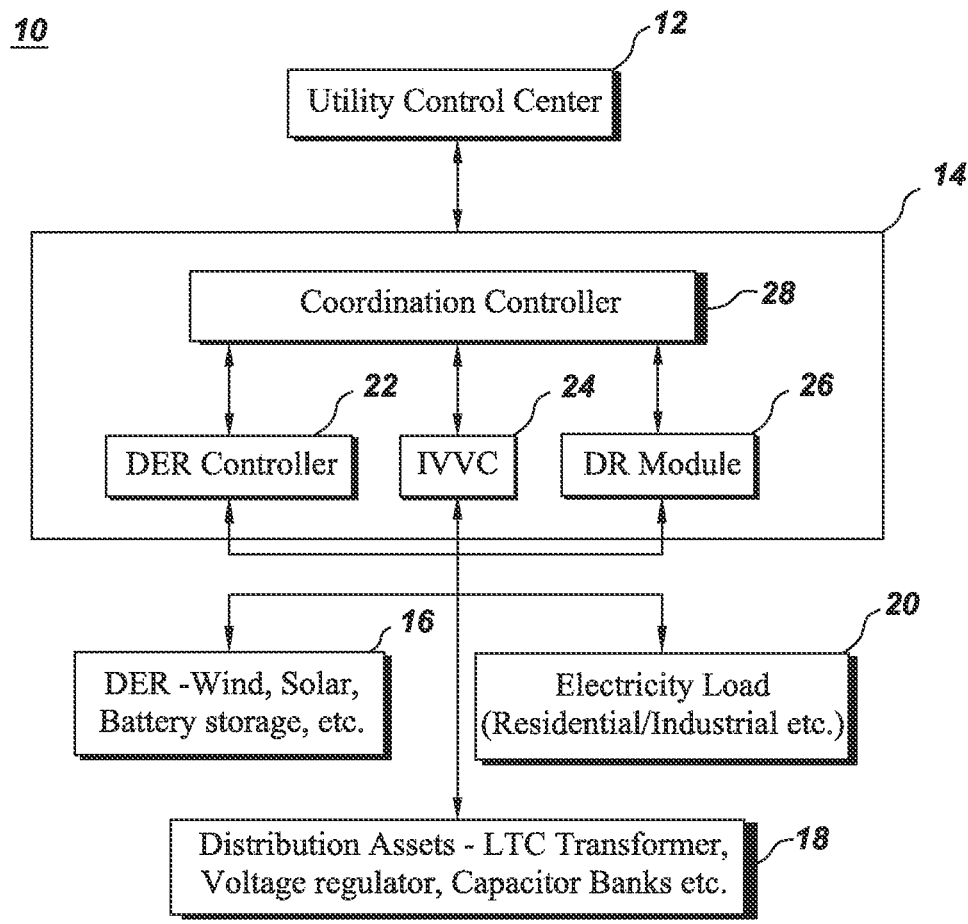
FIG. 1 is a schematic diagram of a part of a power system in accordance with an embodiment of the present invention.

FIG. 1 shows a part of a power system network 10 in accordance with an embodiment of the present invention. Power system network 10 includes a utility control center 12, distribution management system 14, DERs 16, distribution assets 18 and electricity loads 20. Electricity loads 20 may include residential, commercial or industrial loads and receive power from either DERs 16 or other parts of a power grid (not shown). The power received by electricity loads 20 is controlled through distribution assets 18 which are further controlled by distribution management system 14. Distribution assets 18 include load tap changing (LTC) transformers, voltage regulators, and capacitor banks, for example. DERs 16 may include wind turbines, photovoltaics (PV) cells, fuel cells, microturbines, reciprocating engines, combustion turbines, cogeneration units, sterling engines, and energy or battery storage systems.

Utility control center 12 is a main control center sending control command signals to various components in the power system. In the embodiment shown, utility control center 12 provides information including control command signals to distribution management system 14. Distribution management system 14 in turn controls DERs 16, distribution assets 18 and electricity loads 20. Distribution management system 14 receives data from each of these components and also provides control command signals to these components. The communication modes between these various components can include fiber optics, power line carrier systems, and various wireless technologies, for example.

Distribution Management System 14 includes a DER controller 22, an Integrated Volt-Var Controller (IVVC) 24, and a Demand Response (DR) module 26. DER controller 22 may include modules such as energy storage commitment, unit commitment and economic dispatch which will be described in subsequent paragraphs. Distribution management system 14 further includes a coordination controller 28 to coordinate between DER controller 22, IVVC 24 and DR controller 26. In one embodiment, DER controller 22 controls DERs 16, IVVC 24 controls distribution assets 18 and DR controller 26 controls electricity loads 20 based on a control command signal from utility control center 12. The control command signal from utility control center 12 may be based on an overall objective function which includes reducing overall power losses in the distribution system or maintaining a flat voltage profile in the distribution system or even reducing overall operating cost. In another embodiment, when overall optimum performance is not needed DER Controller 22, IVVC 24 and DR controller 26 may operate individually to achieve their own objective function. Coordination controller 28 coordinates among DER controller 22, IVVC 24 and DR controller 26 to ensure that none of the limits such as voltage or current limits is violated in power system network 10 while the appropriate objective functions are being met or the control command signal is being followed.

Figure 2:
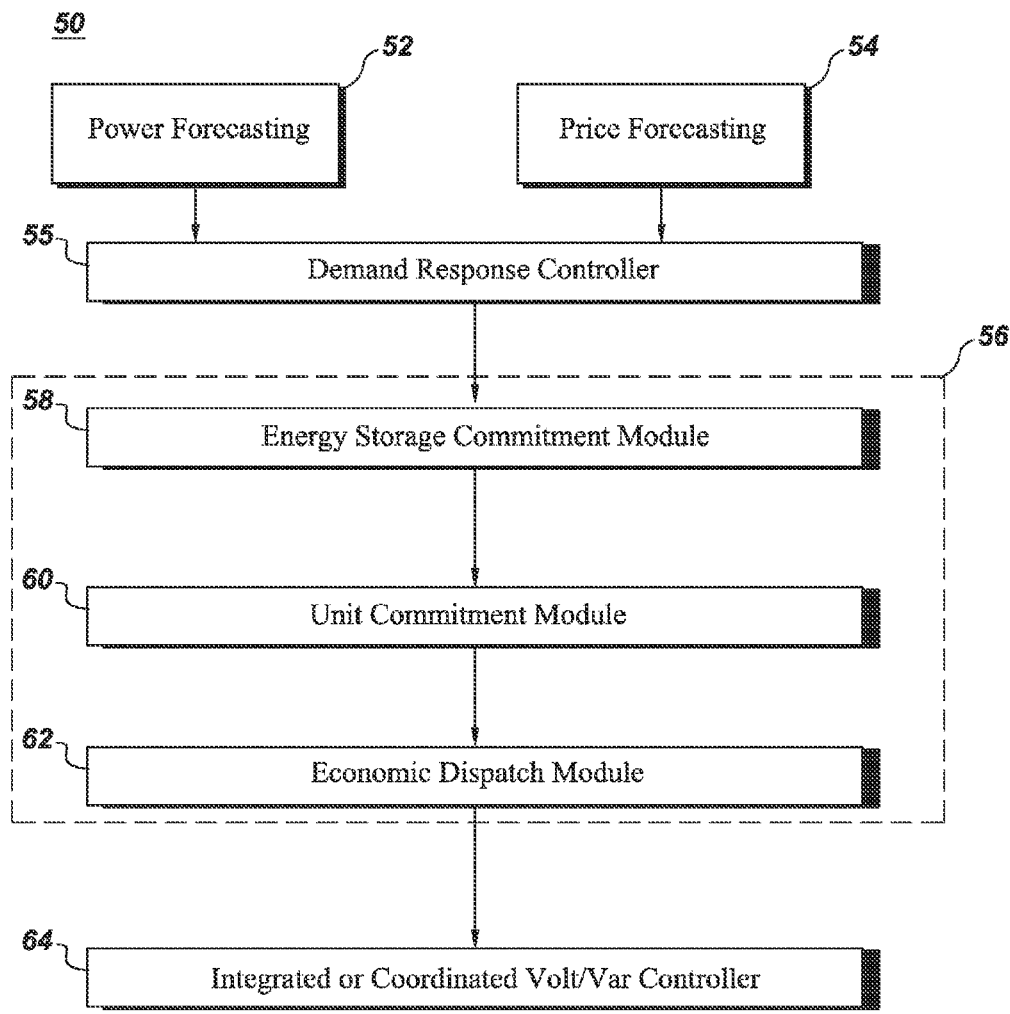
FIG. 2 is a system block diagram illustrating coordination between a DER controller, a Demand Response (DR) controller and an Integrated Volt-VAR controller (IVVC) to control power in the distribution system in accordance with an embodiment of the present invention.

FIG. 2 shows a system block diagram 50 illustrating coordination between DER controller 22, DR controller 26 and IVVC 24 to control power in the distribution system in accordance with an embodiment of the present invention. The system 50 is governed by an overall objective function which includes reducing overall power losses in the distribution system or maintaining a flat voltage profile in the distribution system or even reducing overall operating cost. In one embodiment, the overall objective function may result in a separate objective function for each of the controllers or a set of controllers. A power forecasting module 52 determines power generation forecast from various DERs in the distribution system of a power grid and also load forecast (active and reactive loads) in the distribution system for a time span or a period of interest. The time span is set by a system operator and in one embodiment it may be 24 hours or in another embodiment it may be 12 hours, for example. In another embodiment, the power generation forecast and the load forecast may be in the form of a curve for 24 hours with a time step, 30 minutes or an hour, for example. Power generation and load forecasting is important in determining how much load needs to be supplied by available DERs at any given time of the period of interest. Accordingly, power generation and load forecasts help in planning for the given time span. Power generation and load forecasting techniques utilize various factors such as time, weather conditions, customer types, distribution system conditions, and historical load and weather data to provide a power generation and load forecasts. The time factor includes time of the year, the day of the week, and the hour of the day. For example, there are important differences in load between weekdays and weekends. Weather factors include temperature and humidity. Similarly, a price forecasting module 54 forecasts unit price variation of electricity for the same time span. Price forecasting is important in planning economic operation of the overall distribution system.

Figure 3:
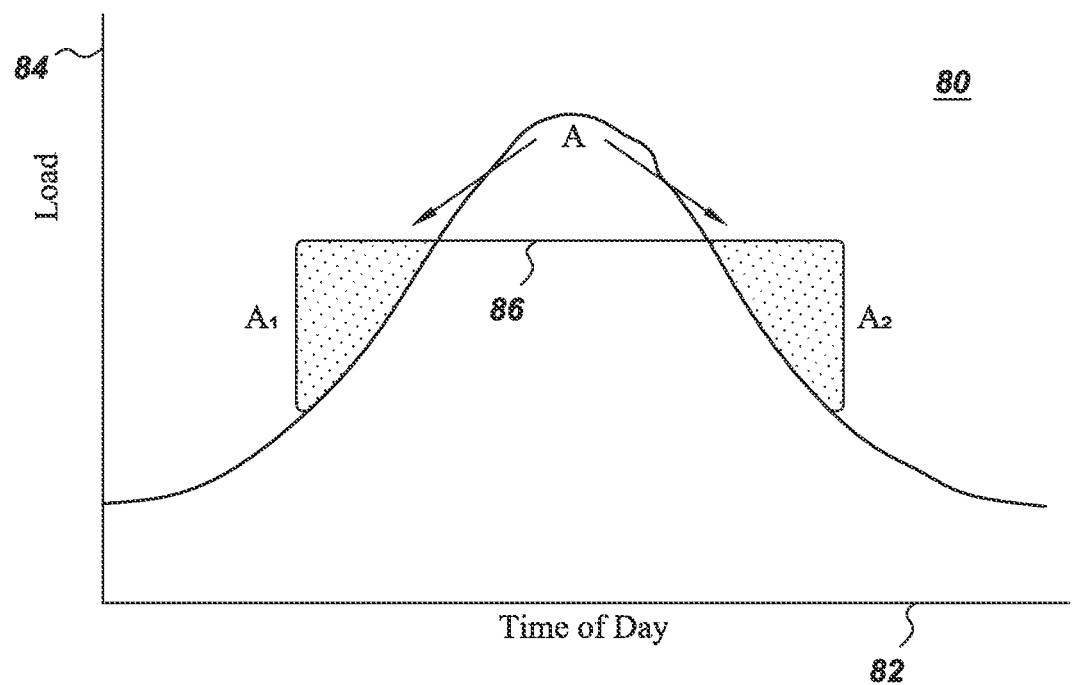
FIG. 3 is a graphical plot illustrating load variations throughout a day.

The information from power forecasting module 52 and price forecasting module 54 is provided to a DR controller 55. DR controller 55 estimates DR events that will occur throughout the defined time span based on power generation and the active and reactive load forecasts. A DR event may be called when demand for energy significantly increases. In general, demand response (DR) refers to mechanisms used to encourage/induce utility consumers to curtail or shift their individual demand in order to reduce aggregate utility demand during particular time periods. Demand response programs typically offer customers incentives for agreeing to reduce their demand during certain time periods since the generation or supply costs are very high during peak load conditions. For example, FIG. 3 shows a plot 80 of load variation throughout a day. A horizontal axis 82 represents time of day and a vertical axis 84 represents load value. As can be seen, a peak load period occurs at the center of plot 80 represented by area A which is above a threshold load value 86. So to shift this peak load below the threshold value 86, the peak load is moved to a time when the load is below the threshold load value 86. In the embodiment shown, load from area A is divided into two areas A1 and A2 and moved below threshold load value 86. This results in a modified forecasted load profile after dispatching optimal amount of available demand response. In one embodiment, the operator chooses the optimal amount of demand response that needs to be dispatched and is dependent on factors such as economic benefit. In another embodiment, the optimal demand response is determined based on overall objective function. It should be noted that in one embodiment, DR controller 55 operates in dynamic mode i.e., if there are differences between forecasted load values and actual load values DR controller 55 can modify its operation.

Demand response programs such as critical peak pricing (CPP), Variable Peak Pricing (VPP), Direct Load Control (DLC), and other various incentive programs are examples of programs wherein a utility specifies contractual obligations on when, how often, and the duration of demand response events for a participating customer. For example, a contract may specify that the utility can invoke up to 15 events per year, where each event will occur between the hours of 12 pm and 6 pm with a maximum of 60 total hours per year. According to embodiments of the invention, the utility can choose to use 10 events of 6 hours each, or 15 events of 4 hours each to meet the DR event, or any other such combination of events and hours to stay within the 15 events, 60 hours limitations for each customer.

Referring back to FIG. 2, the modified load profile from DR controller 55 is then transmitted to DER controller 56. DER controller 56 then schedules DERs to supply loads for the entire time span with various objective functions. DER controller 56 includes an energy storage commitment module 58, a unit commitment module 60, and an economic dispatch module 62.

As discussed earlier, the generation or supply costs are very high during peak load conditions. Thus, in one embodiment, energy storage or batteries may be used to partially meet the peak load. Energy storage commitment module 58 controls operation of energy storage devices in the system such that during off peak hours, when the supply costs are low, the batteries can be charged. Energy storage devices include batteries, capacitors and other devices which can be charged and discharged. These energy storage devices can then be used or discharged during the peak hours when the supply costs are very high. The idea is that if the cost savings as a result of using the energy storage device exceed the cost of using the energy storage device, then the utility would achieve savings from using energy storage device. Energy storage commitment module 58 determines whether to charge or discharge an energy storage device based on various factors. The factors include load for each time step, generation cost for each time step, initial status of the energy storage device, energy storage device capacity, charging efficiency of the energy storage device, minimum reserve of the energy storage device and charge and discharge rate of the energy storage device.

In one embodiment, energy storage commitment module 58 may be placed before DR controller 55 as shown in FIG. 4. In this embodiment, the power forecasting information from power forecasting module 52 may be first supplied to energy storage commitment module 58 and after energy storage commitment module 58 schedules charging and discharging for the energy storage device, an optimal amount of demand response will be dispatched to the modified load profile obtained from energy storage commitment module 58. DR controller 55 then generates a second load profile. Furthermore, the scope of the present invention is not limited to the structure shown and similar other modifications occurring to one skilled in the art are well within the scope of this invention.

A second load profile generated from energy storage commitment module 58 after charging or discharging the energy storage devices is then provided to unit commitment module 60. The second load profile is generated by adding or subtracting total amount of energy storage device discharge or charge respectively from the modified load profile. Unit commitment module 60 determines which available DERs should be running in each time period of the time span so as to meet the second load profile or the varying demand of electricity. In one embodiment, power may also be obtained from grid rather than generating it from DERs. Unit commitment module 60 facilitates maintaining minimum operating costs of supplying power to loads from all available DERs and the power grid while simultaneously satisfying system constraints. In one embodiment, the system constraints may include voltage limits set by system operator across all system nodes whereas in another embodiment, the system constraint may be reactive power limits.

In one embodiment, the unit commitment problem may be formulated over a time span of $T_U$ as given below:

$$\text{minimize} \sum_{i=1}^{N} c_i x_i \quad (1)$$

$$\text{subject to} \sum_{i=1}^{N} p_i x_i \geq P \quad (2)$$

where $x_i = 0$ or 1 and first M elements out of N elements of x represent DER units while the last L elements correspond to a grid power quantum, and $c_i$ is the cost associated with committing a DER unit or obtaining power from the grid. The grid power quantum refers to the minimum of the collection of maximum power ratings provided by DER units. Thus, L may be given as total power obtained from the grid divided by the minimum of the collection of maximum power ratings provided by DER units. Thus, if a DER unit is committed or some of the power is obtained from the grid, then $x_i = 1$. Similarly, P is the maximum power over time span $T_U$ needed to be provided by the DER or the grid and is calculated by subtracting the total load from renewables and storage, $p_i$ is the maximum power that can be provided by the DER or maximum grid quantum.

Once the unit commitment module 60 determines the DER schedule for various DER units and the power from the grid i.e., when a schedule for utilizing power from DER units and the power from the grid is determined, economic dispatch module 62 determines the optimum operating point for the scheduled N units. The difference between the unit commitment and economic dispatch problem is that the economic dispatch problem assumes that there are N units (out of total number of units) already committed in the system. The purpose of the economic dispatch problem is to find the optimum operating point for these N units. In one embodiment, the economic dispatch problem may be formulated as a linear programming problem with simplified models of assets as follows:

$$\text{minimize} \sum_{i=1}^{N} \bar{c}_i y_i \quad (3)$$

$$\text{subject to} \quad Ay \leq b \quad (4)$$
$$A_{eq} y = b_{eq}$$

where y is a subset of x corresponding to committed DER units or scheduled grid quanta. A, b, $A_{eq}$ and $b_{eq}$ are system constraints which may vary based on system operator requirement, for example, when a generator starts up it should at least have the base load—minimum power rating. The cost associated with each DER unit or grid quanta is now a function of fuel cost and some form of penalty. The constraints depend on the lower and upper bounds on power amplitudes and power per time step as well as penalties on operating at the lower bound.

Unit commitment module 60 and economic dispatch module 62 together provide a means to allocate DERs for optimal operation of the electric power in the distribution system. The information from these modules along with the second load profile is then provided to an integrated volt-var controller (IVVC) module 64 which runs a load flow algorithm to determine voltage and power profiles at various nodes in the distribution system. The load flow algorithm includes numerical methods such as William Kersting's backward/forward sweep algorithm. IVVC module 64 further utilizes various coordination algorithms to coordinate operation of distribution assets such as capacitance banks, voltage regulators and transformers. IVVC module 64 ensures improved power factor and reduces voltage limit violations in the system and maintains a voltage profile set by an operator. In one embodiment, the IVVC coordination algorithm is based on dynamic programming. In another embodiment, the IVVC coordination algorithm is based on a heuristic method. In yet another embodiment, the IVVC coordination algorithm may be based on a combination of dynamic programming and heuristic method.

Finally, various operating schedule and operating point signals determined for DERs, distribution assets, and loads by DER controller, IVVC and DR controller, respectively are transmitted to and acted on by local controllers. In one embodiment, a few controllers may operate more than once during the time span. For example, in real time, distribution asset schedules may be modified every 2 hours to account for any real time changes in the system.

FIG. 5 shows a flow chart 100 illustrating a method of controlling power in a distribution system in accordance with an embodiment of the present invention. The objective of controlling power in the distribution system includes reducing overall power losses in the distribution system or maintaining a flat voltage profile in the distribution system or even reducing overall operation cost in the distribution system. In step 102, the method includes forecasting a load profile of the distribution system for a period of interest and a generation profile for all available DERs in the distribution system. The period of interest is set by a system operator. In one embodiment, the load forecast is determined based on time, weather conditions, customer types, distribution system conditions and historical data.

In step 104, an available demand response on the distribution system for the period of interest is estimated and also an amount of demand response determined by system operator is dispatched and the load profile from step 102 is modified accordingly based on dispatched demand response. The available demand response on the distribution system may be determined based on at least one of a critical peak pricing (CPP) program, a variable peak pricing (VPP) program or a direct load control (DLC) program. In one embodiment, the load profile is modified by shifting a peak load above a threshold value to a time where the load is below the threshold value.

A charging and discharging schedule of energy storage devices in the distribution system for the period of interest is determined in step 106 based on the modified load profile. The charging and discharging schedule of energy storage devices include charging the energy storage devices during off peak hours and discharging during peak hours. Furthermore, the charging and discharging schedule of energy storage devices is determined based on factors including the load for each time step, generation cost for each time step, initial status of an energy storage device, an energy storage device capacity, charging efficiency of the energy storage device, minimum reserve of the energy storage device and charge and discharge rate of the energy storage device.

At step 108, a DER schedule of supplying electrical power to the loads in a second load profile is determined based on a first objective function. The DER schedule includes a schedule for utilizing power from DERs and a power grid. The second load profile may be generated by adding or subtracting a total amount of energy storage device discharge or charge respectively from the modified load profile. In one embodiment, the first objective function includes minimizing operating costs of supplying power to loads from DERs and the power grid power while simultaneously satisfying system constraints including voltage limits or reactive power limits on the nodes in the distribution system.

An optimum operating point for each of the DERs in the DER schedule is determined at step 110. The optimum operating point for each DER may be determined based on constraints including lower and upper bounds on power amplitudes, power per time step and penalties on operating at the lower bound. Finally, in step 112, control signals are sent to distribution assets in the distribution system so as to maintain a voltage profile for the period of interest. The distribution assets include capacitance banks, voltage regulators and transformers. To maintain the voltage profile, a load flow algorithm may be utilized to determine voltage information at various nodes in the distribution system. The load flow algorithm includes numerical methods such as William Kersting's backward/forward sweep algorithm. It should be noted that some of the steps in flow chart 100 may be repeated with a particular time step to so as to account for any real time changes in the system.

Advantages of the embodiments of the present invention include tighter control of load demand, reduced peak load, reduced real and reactive power losses, improved energy efficiency, high power factor, and tighter control of network voltage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system comprising:
a power forecasting module for forecasting a load profile of a distribution system and a power generation forecast of distributed energy resources (DERs) in the distribution system for a period of interest;
a demand response module for estimating an available demand response on the distribution system for the period of interest based on the load profile and the power generation forecast and modifying the load profile by dispatching an optimal demand response;

an energy storage commitment module to determine a charging and discharging schedule of energy storage devices in the distribution system for the period of interest based on the modified load profile and generate a second load profile by incorporating the charging and discharging schedule of energy storage devices in the modified load profile;

an unit commitment module to determine a DER schedule of supplying electrical power to the loads in the second load profile based on a first objective function;

an economic dispatch module to determine an optimum operating point for each DER in the DER schedule; and an Integrated Volt-VAR Control (IVVC) module having software and hardware elements to control distribution assets to maintain a voltage profile for the period of interest in the distribution system based on information from the economic dispatch module.

2. The distribution system of claim 1, wherein the load forecast is determined based on time, weather conditions, customer types, distribution system conditions and historical data.

3. The distribution system of claim 1, wherein the modified load profile is obtained by shifting a peak load above a threshold value to a time where the load is below the threshold value.

4. The distribution system of claim 1, wherein the charging and discharging schedule of energy storage devices include charging the energy storage devices during off peak hours and discharging during peak hours.

5. The distribution system of claim 1, wherein the energy storage commitment module determines the charging and discharging schedule based on factors including load for each time step, generation cost for each time step, initial status of the energy storage device, the energy storage device capacity, charging efficiency of the energy storage device, minimum reserve of the energy storage device and charge and discharge rate of the energy storage device.

6. The distribution system of claim 1, wherein the second load profile is generated by adding or subtracting a total amount of energy storage device discharge or charge respectively from the modified load profile.

7. The distribution system of claim 1, wherein the DER schedule includes a schedule for utilizing power from DERs and a power grid.

8. The distribution system of claim 7, wherein the first objective function includes minimizing operating costs of supplying power to loads from DERs and the power grid with system constraints.

9. The distribution system of claim 8, wherein the system constraints include voltage limits or reactive power limits.

10. The distribution system of claim 1, wherein the optimum operating point for each DER is determined based on constraints including lower and upper bounds on power amplitudes, power per time step and penalties on operating at the lower bound.

11. The distribution system of claim 1, wherein the IVVC module includes a load flow algorithm to determine voltage information at various nodes in the distribution system.

12. The distribution system of claim 1, wherein the distribution assets include capacitance banks, voltage regulators and transformers.

13. A method of controlling electrical power in a distribution system comprising:

forecasting a load profile of the distribution system and a power generation profile of distributed energy resources (DERs) in the distribution system for a period of interest;

estimating an available demand response on the distribution system for the period of interest and modifying the load profile by dispatching an optimal demand response;

determining a charging and discharging schedule of energy storage devices in the distribution system for the period of interest based on the modified load profile and generating a second load profile by incorporating the charging and discharging schedule of energy storage devices in the modified load profile;

determining a DER schedule of supplying electrical power to the loads in the second load profile based on a first objective function;

determining an optimum operating point for each DERs in the DER schedule; and controlling distribution assets in the distribution system to maintain a voltage profile for the period of interest.

14. The method of claim 13, wherein the load profile is forecasted based on time, weather conditions, customer types, distribution system conditions and historical data.

15. The method of claim 13, wherein the charging and discharging schedule of energy storage devices include charging the energy storage devices during off peak hours and discharging during peak hours.

16. The method of claim 13, wherein charging and discharging schedule is determined based on factors including load for each time step, generation cost for each time step, initial status of the energy storage device, the energy storage device capacity, charging efficiency of the energy storage device, minimum reserve of the energy storage device and charge and discharge rate of the energy storage device.

17. The method of claim 13, wherein the second load profile is generated by adding or subtracting a total amount of energy storage device discharge or charge respectively from the modified load profile.

18. The method of claim 13, wherein DER schedule includes a schedule for utilizing energy from DERs and a power grid.

19. The method of claim 18, wherein the first objective function includes minimizing operating costs of supplying energy to loads from DERs and the power grid power with system constraints.

20. The method of claim 13, wherein the optimum operating point for each DER is determined based on constraints including lower and upper bounds on power amplitudes, power per time step and penalties on operating at the lower bound.

21. A system comprising:

a power forecasting module for forecasting a load profile of the distribution system and a power generation forecast of distributed energy resources (DERs) in the distribution system for a period of interest;

an energy storage commitment module to determine a charging and discharging schedule of energy storage devices in the distribution system for the period of interest based on the load profile and the power generation forecast and modify the load profile based on the charging and discharging schedule of energy storage devices;

a demand response module for estimating an available demand response on the distribution system for the period of interest based on a modified load profile and generating a second load profile by dispatching an optimal demand response;

an unit commitment module to determine a DER schedule of supplying electrical power to the loads in the second load profile based on a first objective function;

an economic dispatch module to determine an optimum operating point for each DERs in the DER schedule; and an IVVC module having software and hardware elements to control distribution assets to maintain a voltage profile for the period of interest in the distribution system based on information from the economic dispatch module.

* * * * *